No. 753,646. PATENTED MAR. 1, 1904.
J. A. SWINEHART.
TIRE FOR VEHICLE WHEELS.
APPLICATION FILED JULY 9, 1903.
NO MODEL.
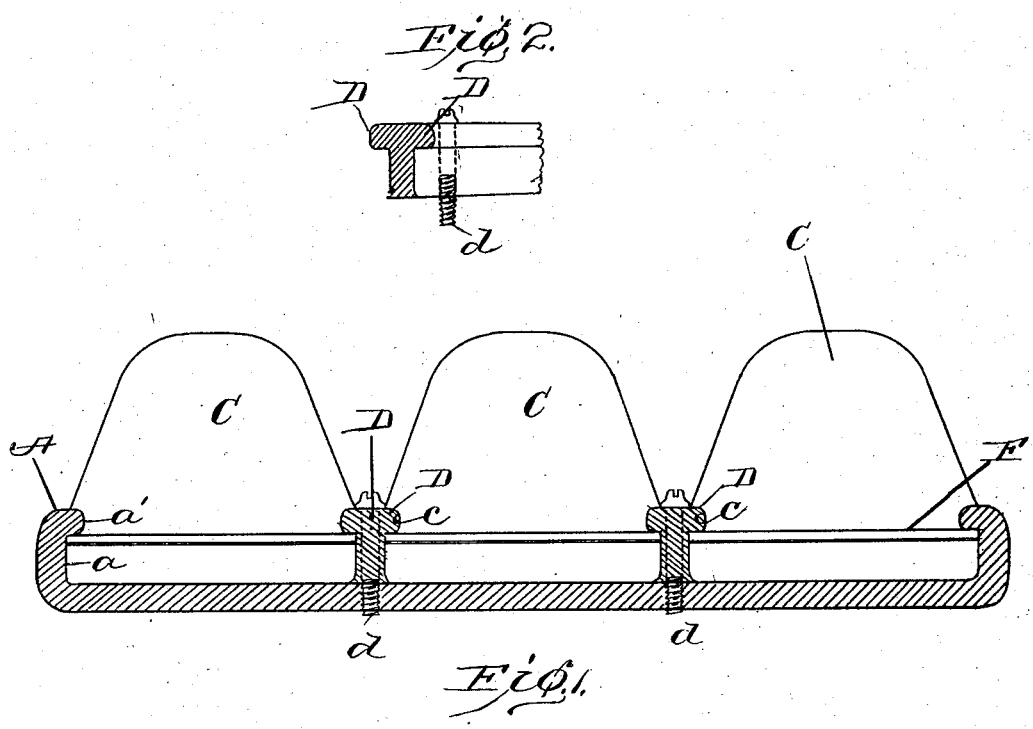

No. 753,646. Patented March 1, 1904.

UNITED STATES PATENT OFFICE.

JAMES ALLEN SWINEHART, OF AKRON, OHIO.

TIRE FOR VEHICLE-WHEELS.

SPECIFICATION forming part of Letters Patent No. 753,646, dated March 1, 1904.

Application filed July 9, 1903. Serial No. 164,892. (No model.)

*To all whom it may concern:*

Be it known that I, JAMES ALLEN SWINEHART, residing at Akron, in the county of Summit and State of Ohio, have invented certain new and useful Improvements in Tires for Vehicle-Wheels; and I do hereby declare the following to be a full, clear, and exact description of the same, reference being had to the accompanying drawings, forming a part of this specification, and to the letters of reference marked thereon.

This invention relates to improvements in vehicle-tires having a rubber or elastic tread, and particularly to that class wherein the rubber or elastic tread is secured in a channel wheel-rim, the objects of the invention being to provide for the use of rubber or elastic treads on wide rims and to secure the maximum resiliency with the employment of a minimum quantity of rubber.

A further object of the invention is to provide for the use of a plurality of rubber or elastic tread sections extending around the rim, whereby narrow stock-tires may be employed for such wide rims with a corresponding saving in cost of manufacture and cost of application to the wheel.

To the above ends the invention consists in certain novel details of construction and combinations and arrangements of parts, all as will be now described, and pointed out in the appended claims.

In the accompanying drawings, Figure 1 is a cross-sectional view of a wheel-rim with the elastic tires secured thereto. Fig. 2 is a detail of a retainer of preferred form.

Similar letters of reference in both figures indicate the same parts.

The letter A in the drawings indicates the rim of a wheel, which latter may be of any ordinary construction, and as it forms no part of this invention it has not been deemed necessary to illustrate the same. The rim A, preferably of metal, is secured to the wheel in any preferred manner and has upwardly-extending marginal flanges $a$ with inwardly-extending portions $a'$, thereby forming an undercut channel for the tire.

The tire-sections C, of any desired or preferred shape in cross-section, are preferably rubber and have in each side at a suitable distance from their bases longitudinally-extending grooves or channels $c$. Two or more of these tire-sections C are placed within the rim A side by side, the number depending upon the width of the rim, and are secured in place in the following manner: The portions $a'$ of the flanges $a$ fit in the grooves or channels $c$ in the outer sections, and between each of the sections C are intermediate fasteners consisting, preferably, of metal strips T shape in cross-section with their heads D of such width as to extend into the grooves in the adjacent faces of the elastic tire-section C. The fastening-strips are separate from but adapted to be secured to the rim by means of screws $d$ or other equivalent fastening means.

While the fastening-strip has been described as being T shape in cross-section, it will of course be understood that other forms may be employed, the only requirement being that they be of such shape as to take into the tire-sections.

By this invention it will be seen that broad wheels may be readily equipped with elastic tires by the employment of two or more tire-sections of relatively narrow width where otherwise on account of the cost and cumbersomeness of a single tire-section it would be impracticable to equip such wheels. Where desired, a plurality of tires designed for narrow rims may be employed side by side, and consequently stock tires narrow in cross-section may be employed for equipping wide rims.

The sections are preferably frusto-conical in cross-section to leave a space between them for the transverse expansion of the rubber under pressure, whereby the elasticity and wearing qualities are increased. One or more of the sections may be removed and another substituted, or one section may be repaired without disturbing the other sections, and hence injury or wear on one section does not require the removal of the whole tire, as would be the case with an integral structure.

To insure the retention of the tires, cross-wires or rigid retainers F are arranged in the same in position to extend under the overhanging portions of the channel, such construction being entirely practical because of the removability of the intermediate fasteners, which permits of the placing of the sections before the fastening devices are secured in place.

Having thus described my invention, what I claim as new, and desire to secure by Letters Patent, is—

1. In a vehicle-wheel the combination with the channel-rim, of the elastic tire-sections extending longitudinally within said rim, and removable fastening-strips extending between the tire-sections; substantially as described.

2. In a vehicle-wheel, the combination with the channel-rim, having the marginal flanges, the tire-sections secured in said rim, and the fastening-strips extending between and bearing against proximate sections, and means for removably securing the strips to the rim; substantially as described.

3. In a vehicle-wheel, the combination with the rim having the upwardly and inwardly extending marginal flanges, of the elastic tire-sections formed with longitudinally-extending side grooves, with which coöperate the inturned flanges of the rim, and fastening-strips extending between proximate tire-sections having lateral projections coöperating with the grooves in the sections, and means for securing the strips to the wheel; substantially as described.

4. In a vehicle-wheel, the combination with the rim, of the tire-sections having longitudinally-extending side grooves, and fastening-strips T shape in cross-section extending between proximate sections, the branches of the head of the strip entering the grooves in the tire-sections, and means for securing the strips to the rim; substantially as described.

5. In a vehicle-wheel tire, the combination with the rim having the undercut channel, of the elastic tire-sections having transversely-extending rigid retainers, the removable headed fastening-strips extending between proximate tire-sections, said rigid retainers underlying the heads of the fastening-strips and flange of the rim; substantially as described.

JAMES ALLEN SWINEHART.

Witnesses:
P. D. HALL,
CHARLES MOTZ.